United States Patent Office 3,748,342
Patented July 24, 1973

3,748,342
INTERMEDIATES FOR PREPARING
QUINAZOLINONES
George A. Cooke, Denville, and William J. Houlihan,
Mountain Lakes, N.J., assignors to Sandoz-Wander,
Inc., Hanover, N.J.
No Drawing. Filed May 6, 1971, Ser. No. 140,990
Int. Cl. A61k 27/00; C07d 63/12, 63/14
U.S. Cl. 260—332.3 P                         1 Claim

ABSTRACT OF THE DISCLOSURE

Processes are provided for preparing 1,4-disubstituted-methylenedioxy - 2(1H) - quinazolinones which are useful as pharmaceutical agents, e.g., anti-inflammatory agents.

---

This invention relates to 2(1H)-quinazolinone derivatives. More particularly, this invention provides processes and intermediates for preparing compounds of Formula I:

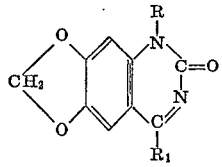

(I)

in which

R signifies an alkyl radical of 1 to 5 carbon atoms, e.g., methyl, ethyl, isopropyl and t-butyl; cyclo(lower)alkyl of 3 to 6 carbon atoms, e.g., cyclopropyl and cyclohexyl; or cyclo(lower)alkyl(lower) straight chain alkyl of 4 to 7 total carbon atoms in which the cycloalkyl is of 3 to 6 carbon atoms and the straight chain alkyl is of 1 to 3 carbon atoms, e.g., cyclopropylmethyl; and $R_1$ signifies a radical of Formula II:

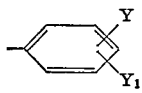

(II)

or of Formula III:

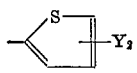

(III)

in which either Y and $Y_1$ are the same or different and signify a hydrogen, fluorine or chlorine atom, an alkyl or alkoxy radical of 1 to 3 carbon atoms, or a nitro or trifluoromethyl group, provided that no more than one of Y and $Y_1$ signifies a trifluoromethyl or nitro group;
or Y and $Y_1$ are on adjacent carbon atoms and together signify a methylenedioxy group, and
$Y_2$ signifies a hydrogen, fluorine or chlorine atom, or an alkyl radical of 1 to 3 carbon atoms.

The processes of this invention are characterised by (a) producing a compound of Formula Ia,

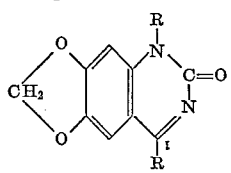

(Ia)

in which R and $R_1$ are as defined above, by cyclising a compound of Formula IV,

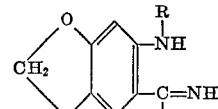

(IV)

in which R and $R_1$ are as defined above,
with phosgene, and (b) producing a compound of Formula Ib,

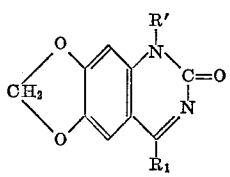

(Ib)

in which $R_1$ is as defined above, and
R' has the same significance as R, defined above, except that it may not signify a tertiary alkyl group in which the tertiary carbon atom is directly attached to the ring nitrogen atom, by cyclising a compound of Formula IVa,

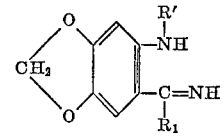

(IVa)

in which R' and $R_1$ are as defined above,
with a carbonic acid derivative selected from the group consisting of (i) a $C_{1-2}$ alkyl chlorocarbonate,
(ii) a $C_{1-5}$ alkyl carbamate, and
(iii) 1,1'-carbonyldiimidazole, provided that when a $C_{1-5}$ alkyl carbamate is employed, the reaction is effected at a temperature of at least 140° C.

Process (a) is suitably carried out at a temperature of from 0° C. to 50° C., preferably 10° C. to 30° C. The reaction may be carried out in an organic solvent which is inert under the reaction conditions, suitably an aromatic hydrocarbon, e.g. benzene, toluene, and xylene, preferably benzene. The mole ratio of phosgene to the compound of Formula IV is not particularly critical but a substantial excess of phosgene is preferably employed. The process may optionally be carried out in the presence of an acid-binding agent such as an inorganic base, e.g. sodium or potassium carbonate, or a tertiary amine, e.g. a trialkylamine or pyridine, preferably triethylamine.

Process (b)(i) involving reaction of a compound of Formula IVa with methyl chlorocarbonate or ethyl chlorocarbonate, preferably ethyl chlorocarbonate, may suitably be carried out at a temperature of from 30° C. to 150° C., preferably 60° C. to 100° C. The reaction may be carried out in an organic solvent which is inert under the reaction conditions, suitably an aromatic hydrocarbon, e.g. benzene, toluene, and xylene, preferably benzene. Other suitable solvents include dioxane. The mole ratio of the chlorocarbonate to the compound of Formula IVa is not critical but the reaction is preferably carried out with a substantial excess of the chlorocarbonate. The reaction time may, for example, range from ½ hour to 10 hours, more usually 1 to 4 hours. The cyclisation with the chlorocarbonate may be optionally carried out in the presence of an acid-binding agent such as an inorganic base, e.g. sodium carbonate or potassium carbonate, or a tertiary amine, e.g. a trialkylamine or pyridine, more preferably triethylamine.

Process (b)(ii) is suitably carried out at a temperature of from 140° to 200° C., preferably 160° to 180° C. The mole ratio of the alkyl carbamate, preferably urethane, to the compound of Formula IVa is not critical. In the preferred forms of practice, there is employed a substantial excess of carbamate which also serves as the preferred solvent for the reaction. Other suitable high-boiling organic solvents which are inert under the reaction conditions may alternatively or additionally be employed, if desired. The reaction time may for example range for ½ to 10 hours, more usually 1 to 4 hours. The cyclisation with the carbamate is optionally and preferably conducted in the presence of a Lewis acid as catalyst for the reaction. The amount of Lewis acid employed is preferably between about 5% and 20% based on the weight of Compound IVa in the reaction mixture. The preferred catalyst is zinc chloride.

Process (b)(iii) is suitably carried out at a temperature of from 20° C. to 120° C., preferably 60° C. to 90° C. The reaction is preferably carried out in an organic solvent which is inert under the reaction conditions, suitably an aromatic hydrocarbon, e.g. benzene, toluene or xylene, especially benzene. The mole ratio of 1,1'-carbonyldiimidazole to the compound of Formula IVa is not particularly critical but an excess of 1,1'-carbonyldiimidazole is preferably employed.

The resulting compounds of Formula I may be isolated and purified using conventional techniques.

The compounds of Formulae IV and IVa employed as starting materials in processes (a) and (b) may be produced by reacting a corresponding compound of Formula V,

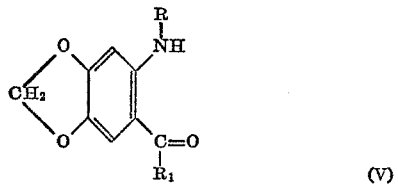

in which R and $R_1$ are as defined above, with ammonia in a known manner. The reaction is desirably carried out in a sealed reactor under anhydrous conditions and at an elevated temperature and pressure. The reaction temperature is suitably from 100° C. to 200° C., preferably 110° C. to 150° C. A catalyst such as a Lewis acid, e.g. zinc chloride, may be employed to advantage in the process. The reaction is preferably carried out using an excess of ammonia as solvent, although a suitable co-solvent, e.g. dioxane, may also be employed.

The compounds of the Formula IV having the Formula IVb,

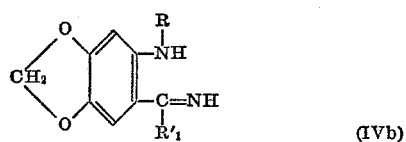

in which R and $R_1'$ are as defined above, may also be produced by reacting a compound of Formula XIX,

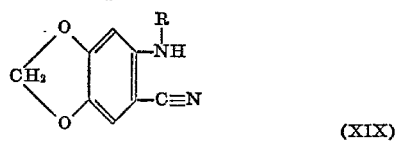

in which R is as defined above, with a compound of Formula IX, $$R'_1Q \qquad (IX)$$

in which $R'_1$ is as defined above, and
Q signifies a lithium atom or a radical —MgX", in which X" signifies a chlorine or bromine atom and hydrolyzing the resulting product in manner known per se.

The reaction of the compound of Formula XIX with the Compound IX is preferably effected at room temperature in an inert organic solvent, e.g. diethyl ether. The compound of Formula IX is preferably a lithium compound. The resulting reaction mixture is suitably subjected directly to hydrolysis in manner known per se. The hydrolysis may suitably be effected for example by simply pouring the mixture over ice.

The compounds of Formula V employed in producing Compounds IV and IVa, as described above, are either known, or may be produced in conventional manner from available materials.

The compounds of Formula XIX, used for producing compounds of Formula IVb as described above, may be produced in manner known per se by tosylation, alkylation and detosylation of a compound of Formula XXVII,

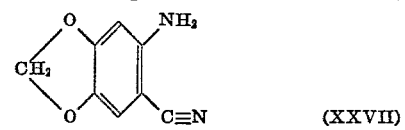

Compounds of Formula XIXa

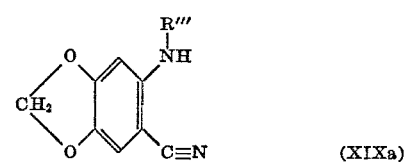

in which R''' signifies cycloalkyl or a branched alkyl radical of 3 to 5 carbon atoms, in which the branching occurs on the carbon atom adjacent to the nitrogen atom, are, however, preferably produced by reacting a compound of Formula XXVII, stated above, with a compound of Formula XXVIII,

in which R''' is as defined above, and X" is bromo or iodo, preferably iodo.

The reaction is desirably carried out in the presence of a base, preferably an inorganic base, such as an alkali metal carbonate, to take up the hydrogen halide liberated during the reaction. The reaction may be effected in an organic solvent which is inert under the reaction conditions, e.g. dioxane, benzene and toluene. However, the use of a solvent is not necessary and a substantial excess of the compound of Formula XXVIII is preferably employed to provide the solvent medium. The reaction is suitably carried out at an elevated temperature which is not especially critical but preferably lies in the range of from 60° C. to 140° C., more preferably 70° C. to 110° C.

The compound of Formula XXVII is known.

Unless otherwise indicated, the products of the various intermediary processes described herein, may be isolated and purified using conventional techniques.

The compounds of Formula I are useful because they possess pharmaceutical activity in animals. In particular, the compounds are useful as anti-inflammatory agents as indicated by the carrageenin-induced edema test in rats. For such use, the compounds may be combined with a pharmaceutically acceptable carrier, and such other conventional adjuvants as may be desired, and preferably administered orally in such forms as tablets, capsules, elixirs, suspensions and the like. For the above-mentioned use, the dosage administered will, of course, vary depending upon known factors such as the particular compound used and mode of administration. However, in general, the compounds of Formula Ia provide satisfactory results when administered at a daily dose of from about 0.15 milligram to 180 milligrams per kilogram of body weight, preferably given in divided doses 2 to 4 times a day, with daily dosage for large mammals ranging from between about 10 milligrams to 1000 milligrams and individual doses between 3 milligrams to 500 milligrams.

The compounds of the Formula I are also useful as analgesics, as indicated by application of pressure to yeast-inflamed foot of the rat (oral administration), and as antipyretics as indicated by inhibition of yeast-induced fever in rats (oral administration). For such uses, the compounds may be administered in modes and forms similar to those employed in the treatment of inflammation and at dosages indicated above as applicable for the use of the compound in the treatment of inflammation.

The compounds may be administered orally in such forms as tablets, dispersible powders, granules, capsules, elixirs, suspensions and syrups, or parenterally in the form of an injectable solution or suspension. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenozate). Capsules may contain the active ingredient alone or admixed with an inert solid diluent, e.g., calcium carbonate, calcium phosphate and kaolin.

The preferred pharmaceutical compositions from the standpoint of preparation and ease of administration are solid compositions, particularly hard-filled capsules and tablets.

A representative formulation is a capsule prepared by conventional techniques and containing the following ingredients:

Ingredient: Parts by weight
Compound of Formula I, e.g. 1-isopropyl-4-phenyl - 6,7 - methylenedioxy - 2(1H) - quinazolinone _____ 50
Inert solid diluent, e.g. kaolin _____ 200

Preferred compounds of Formula I from the point of view of pharmacological activity, are those in which R signifies an isopropyl radical, for example, 1-isopropyl-4-phenyl - 6,7 - methylenedioxy - 2(1H) - quinazolinone and 1 - isopropyl - 4 - (p - fluorophenyl)-6,7-methylenedioxy-2(1H)-quinazolinone.

As used herein, the expression "in manner known per se" means methods in use or described in the literature on the subject.

What is claimed is:
1. A compound of the formula

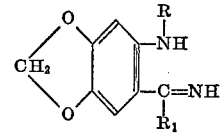

in which
R signifies an alkyl radical of 1 to 5 carbon atoms; cyclo(lower)alkyl of 3 to 6 carbon atoms; or cyclo-(lower)alkyl(lower) straight chain alkyl of 4 to 7 total carbon atoms in which the cycloalkyl is of 3 to 6 carbon atoms and the straight chain alkyl is of 1 to 3 carbon atoms; and
$R_1$ signifies a radical of Formula II:

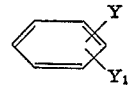 (II)

or of Formula III:

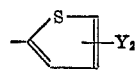 (III)

in which either Y and $Y_1$ are the same or different and signify a hydrogen, fluorine or chlorine atom, an alkyl or alkoxy radical of 1 to 3 carbon atoms, or a nitro or trifluoromethyl group, provided that no more than one of Y and $Y_1$ signifies a trifluoromethyl or nitro group;
or Y and $Y_1$ are on adjacent carbon atoms and together signify a methylenedioxy group, and
$Y_2$ signifies a hydrogen, fluorine or chlorine atoms, or an alkyl radical of 1 to 3 carbon atoms.

References Cited
UNITED STATES PATENTS

| | | | |
|---|---|---|---|
| 3,338,886 | 8/1967 | Berger et al. | 260—239.3 |
| 3,466,284 | 9/1969 | Sherlock | 260—251 |
| 3,509,145 | 4/1970 | Field et al. | 260—251 |
| 3,509,148 | 4/1970 | Bell | 260—251 |
| 3,551,425 | 12/1970 | Petersen | 260—251 |

HENRY R. JILES, Primary Examiner
C. M. S. JAISLE, Assistant Examiner

U.S. Cl. X.R.
260—251 QB, 340.5; 424—251